INVENTORS
Nicholas V. Poletika
Rodrick E. Black
BY
Attorneys

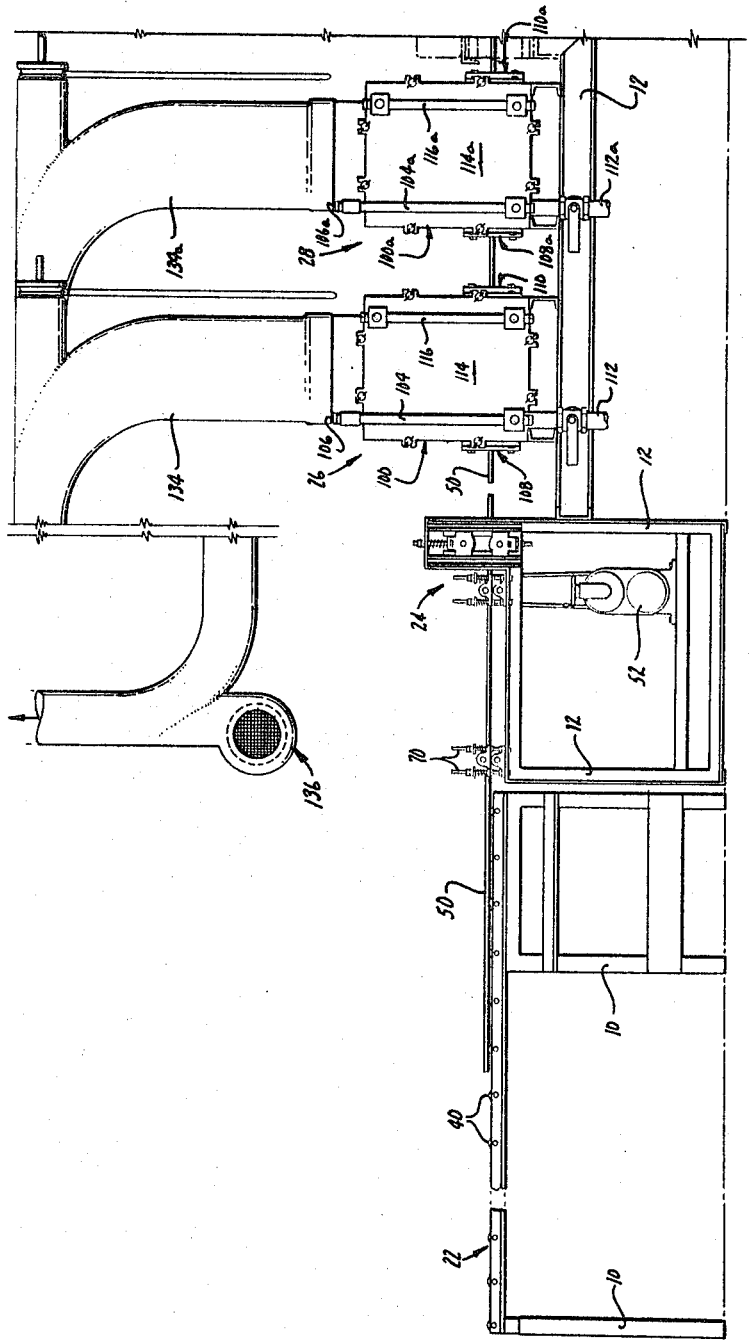
Fig. IA
INVENTORS
Nicholas V. Poletika
BY Rodrick E. Black
Attorneys

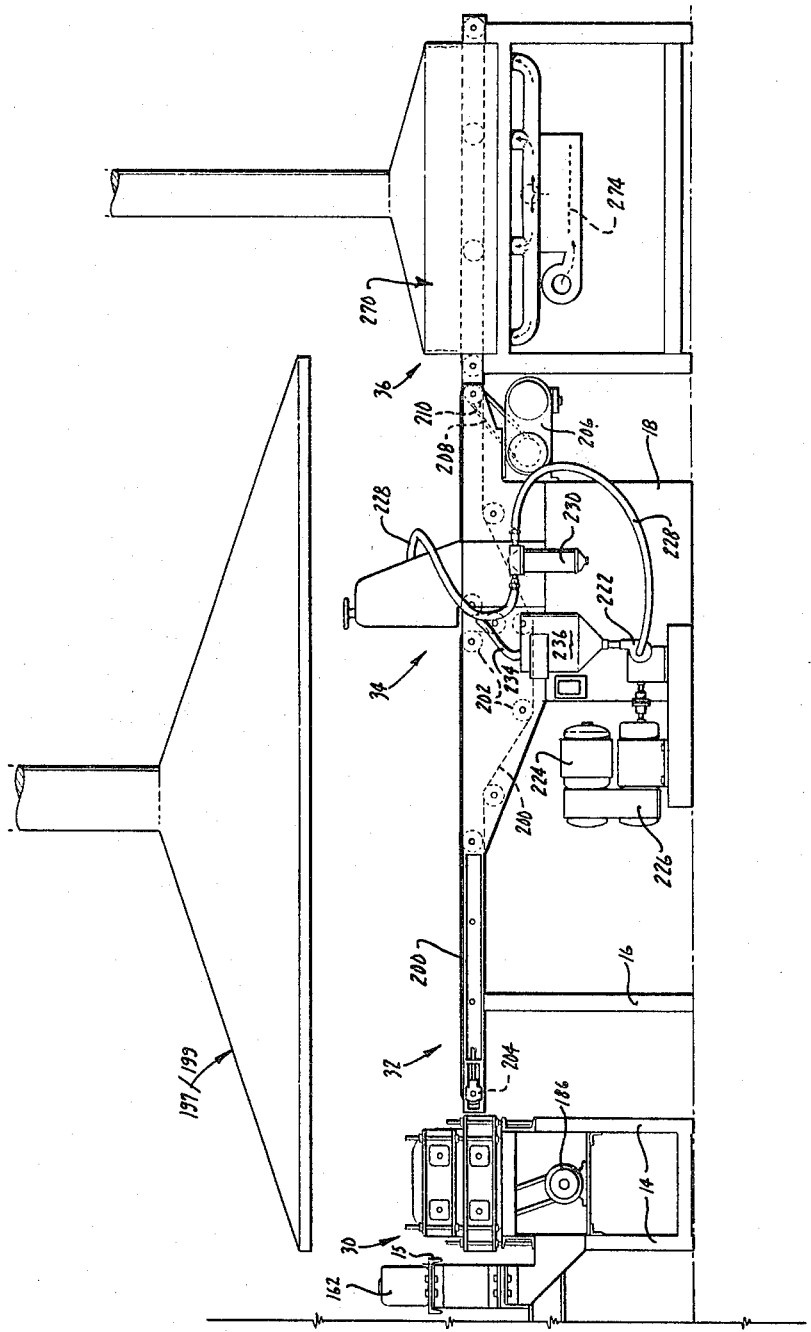

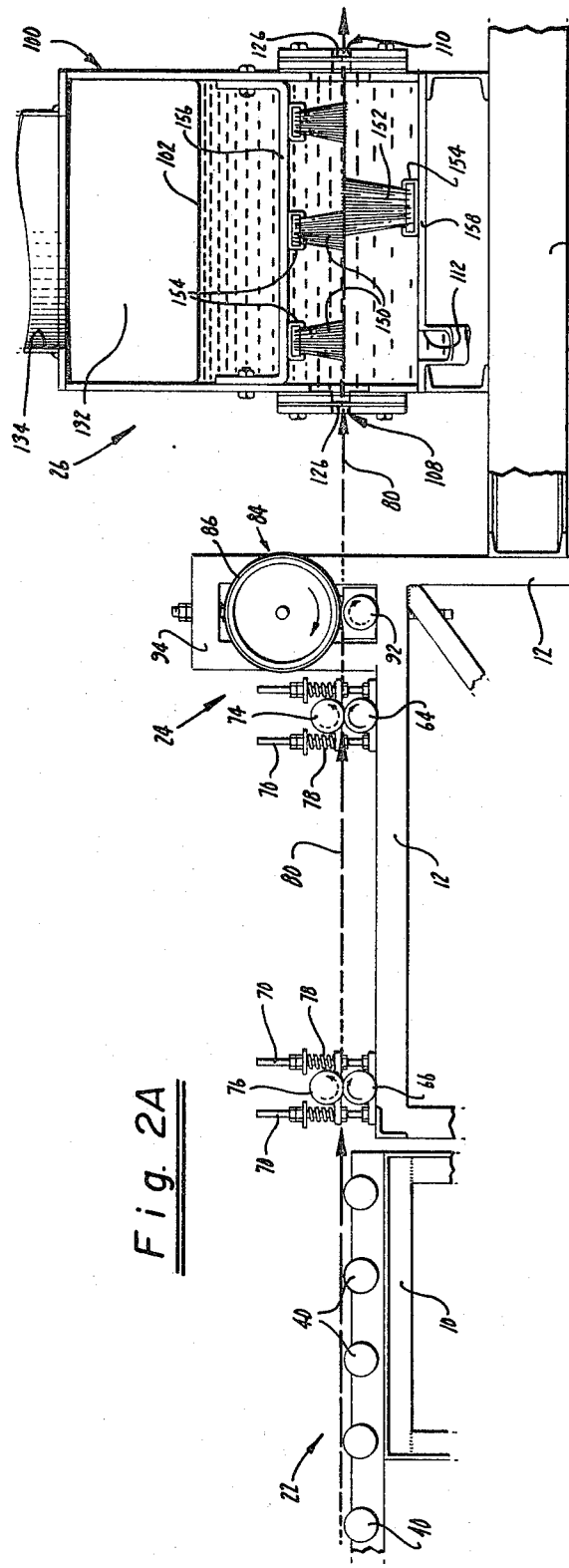

Sept. 6, 1966 N. V. POLETIKA ETAL 3,271,184
METHOD AND APPARATUS FOR THE CONTINUOUS APPLICATION
OF COATINGS TO STRIP MATERIALS
Filed Sept. 26, 1962 7 Sheets-Sheet 5

INVENTORS
Nicholas V. Poletika
BY Rodrick E. Black

Attorneys

Sept. 6, 1966 N. V. POLETIKA ETAL 3,271,184
METHOD AND APPARATUS FOR THE CONTINUOUS APPLICATION
OF COATINGS TO STRIP MATERIALS
Filed Sept. 26, 1962 7 Sheets-Sheet 6
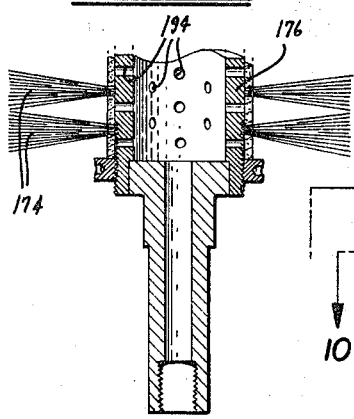
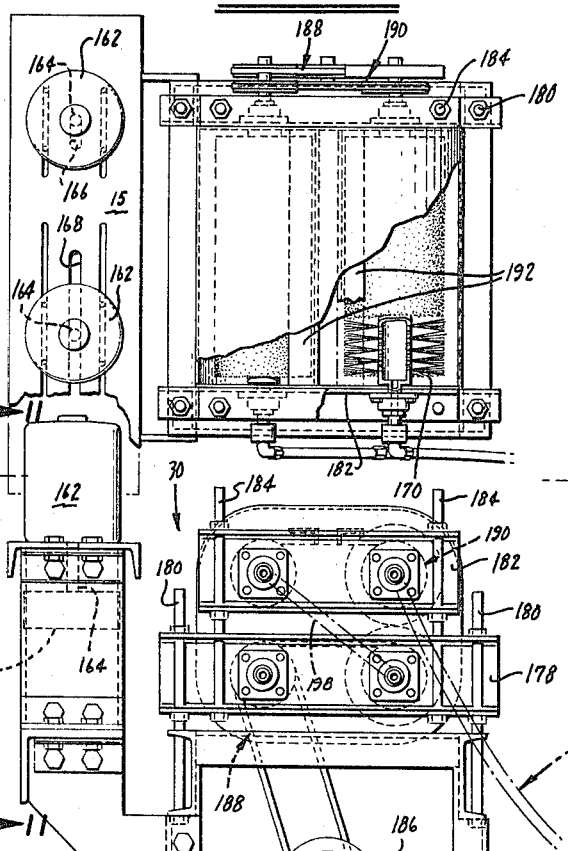
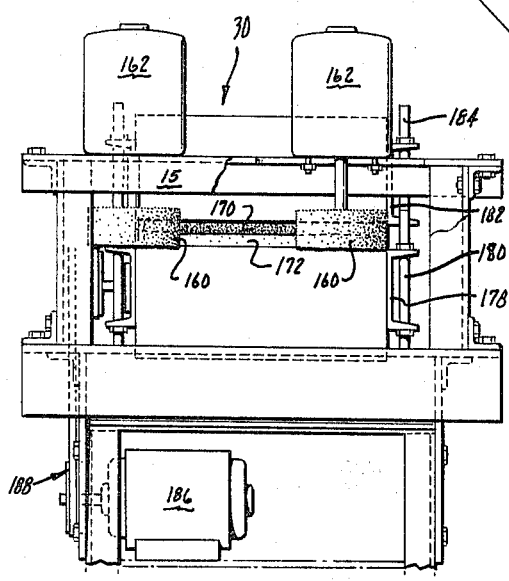
INVENTORS
Nicholas V. Poletika
BY Rodrick E. Black
Attorneys

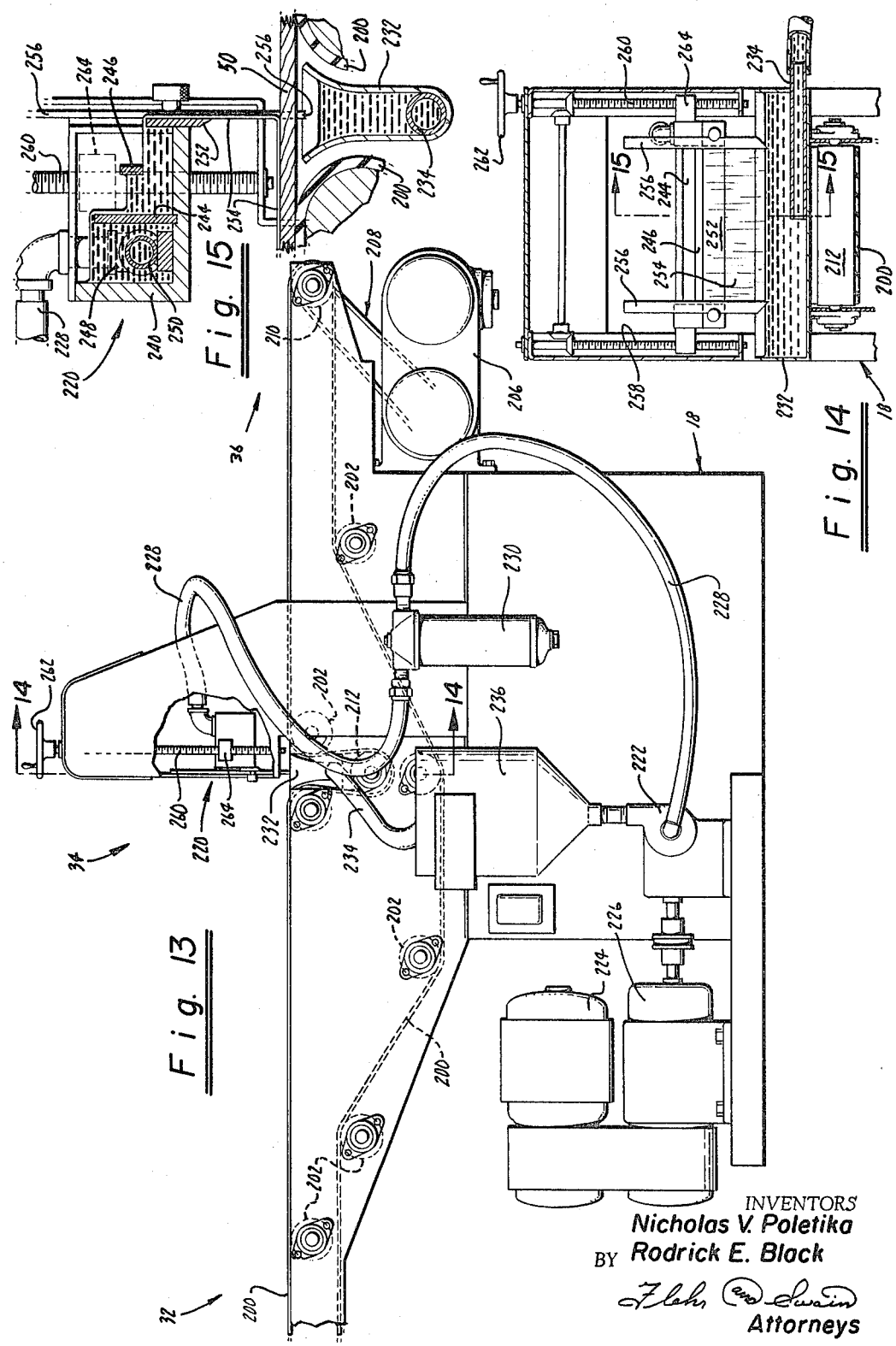

United States Patent Office 3,271,184
Patented Sept. 6, 1966

3,271,184
METHOD AND APPARATUS FOR THE CONTINUOUS APPLICATION OF COATINGS TO STRIP MATERIALS
Nicholas V. Poletika and Rodrick E. Black, Fort Bragg, Calif., assignors to Union Lumber Company, San Francisco, Calif., a corporation of California
Filed Sept. 26, 1962, Ser. No. 226,212
17 Claims. (Cl. 117—65.2)

This invention relates generally to techniques for applying decorative or protective surface coatings, and more particularly to a continuous system and method for use in applying surface coatings to successive units of lumber and similar materials in elongated or strip form.

In recent years, there has been considerable progress in the application of surface coatings under controlled factory conditions. Such processing is typified by the manufacture of factory finished wood flooring, for example as in Patent No. 2,908,590, and in the manufacture of similar pre-fabricated building units. In general, such processing is characterized by a number of shortcomings. Principal among these are the necessity of complete drying, buffing and sanding sequences between each application of coating material to the units being processed. These intermediate sequences must generally be very carefully controlled, (i.e., as to time, temperature, dust control, etc.), with a corresponding increase in the cost of installation and maintenance as well as in the complexity of the entire coating operation. The drying steps particularly prolong and complicate the processing, requiring as much 90% or more of the total processing time as well as expensive drying installations (tunnels and the like) and complicated control machinery.

In general, it is an object of the present invention to provide an improved system and method for the continuous application of decorative and protective surface coatings, which solves problems inherent in former coating techniques by eliminating the necessity for an intermediate drying step.

A further object of the invention is to provide a continuous, high speed coating system and method which is particularly adapted to the coating of strip materials, such as units of lumber and similar materials.

Another object of the invention is to provide a high speed system and method of the above character adapted to coating successive units of strip materials with a high degree of efficiency, and a minimum waste of coating materials.

Another object of the invention is to provide a continuous system and method of such character which effects a continuous adsorption of successive liquid coatings into top layers and onto the surface of the materials being treated, independently of any intermediate drying step, to produce a uniform effective coating of such materials.

Another object of the invention is to provide a rapid, continuous coating system and method which produces coated units having improved drying characteristics.

Other objects and advantages of the present invention will be apparent from the following description of an exemplary embodiment and from the drawings, in which:

FIGURES 1A and 1B are a view in side elevation of a machine embodying the invention;

FIGURES 2A and 2B are schematic views in section and elevation, similar to FIGURES 1A and 1B, illustrating the operation of the machine;

FIGURE 9 is a view in side elevation showing a buffing station within the machine;

FIGURE 10 is a view along the line 10—10 of FIGURE 9;

FIGURE 11 is a view along the line 11—11 of FIGURE 9;

FIGURE 12 is an enlarged view showing a detail of the buffing station;

FIGURE 13 is a view in side elevation of a finish coating station within the machine;

FIGURE 14 is a view in section along the line 14—14 of FIGURE 13; and

FIGURE 15 is a detail view along the line 15—15 of FIGURE 14.

Figure 5:
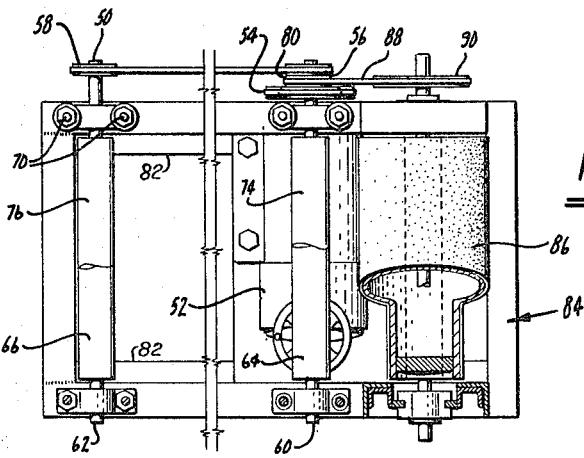
FIGURE 5 is a view along the line 5—5 of FIGURE 4.

Broadly stated, the present invention is predicated on our discovery of a novel method and system of apparatus by which one or more coating materials, such as sealer, penetrating stain, paint, lacquer, varnish, etc. can be successively applied to strip materials without any intermediate drying step. Our new processing is particularly applicable to units of lumber, such as boards, but can also be successfully employed with virtually any fibrous or cellular building material in slab or elongated strip form (e.g., wallboard, sound proofing and similar composition materials, etc.). In general, our process involves the immersing of the strip materials in a first bath of coating material, which may be a solvent, sealer or similar material, coupled with a simultaneous brushing and wiping of the surfaces of the strip material under reduced pressure, to initially remove dirt and extractives and to displace air from surface cells of the strip material. The wiping action also serves to remove excess coating material from the surface of the strip material prior to its being passed to a second bath of coating material. This second bath of coating material may comprise pigmented or unpigmented penetrating sealers, stains, paint or similar materials adapted to alter the appearance and surface characteristics of the strip material. Again the coating is carried out simultaneously with brushing and wiping of the surfaces under reduced pressure, to effect both penetration of the coating material and removal of all excess material not actually adsorbed into or onto the surfaces of the strip material. Following these immersion steps, the units of strip material are immediately subjected to buffing to force the coating material into the exposed surfaces and to remove any remaining excess material so as to present a uniform appearance and surface for subsequent finish coatings. At this point the strip material can be subjected to final drying. Alternatively, a thin film of a finish coating can be continuously applied to an exposed surface of the strip material, following which the units of strip material can be subjected to final drying.

Our processing is characterized by the simplicity of the apparatus which can be employed in carrying it out. The processing is also extremely flexible in its applicability to various types of strip materials. For example, in the treating of boards and other units of lumber, the boards can be first immersed in a cleansing bath of a penetrating solvent or, alternatively, a commercial preservative solution (e.g. pentachlorophenol, creosote, phenol mercury oleate, etc.), following which the boards can be immersed in a bath of primer coat and/or finish coat (e.g. pigmented wood sealer, stain, paint, etc.) to achieve a desired appearance. The manner in which the coating materials are applied in the immersion baths also makes possible the application of a protective finish coat (e.g. clear lacquer, resin based coating, varnish, etc.). Many variations are also possible, for example, the first immersion baths can comprise coatings of preservative and sealer, followed by succeessive coatings of primer, top coats, one or more finish coats, and so on.

In general, the following description is based on operation of our continuous coating machine in conjunction with elongated, relatively thin strip materials, as typified by finished and unifinished units of lumber. Such units are preferably of a standard size (length and cross-section) to insure uniformity of performance. The machine performs the functions of successively receiving the units and positively feeding the same through the immersion or coating baths to the buffing operation. The feeding mechanism also employs the inherent rigidity of the strip materials to force previously fed units through the coating and buffing mechanisms to a discharge conveyor. When finish coatings are employed, the machine also applies a thin film of such coating to the upper surface of the strip material, in a continuous operation, prior to the discharging of the units to a final drying step.

The preferred embodiment of the machine illustrated in the drawing comprises a supporting framework for the various operating mechanisms, as represented at 10, 12, 14, 16, 18 and 20. These separate frame members are positioned to establish a proper spaced relationship for means forming the various operating stations in the machine, including an inlet conveyor 22, a feed conveyor station 24, a first coating station 26, a second coating station 28, a buffing station 30, discharge conveyor 32, a finish coating station 34 and a drying station 36.

*Feed conveyor station*

In the illustrated embodiment of the invention, the inlet conveyor 22 is composed of roller or similar idler conveyor units 40 adapted to receive units 50 of lumber or other strip material at a rate determined by the customary factory or lumbermill operation. The feed conveyor station 24 cooperates with the inlet conveyor 22 to receive the units 50 one after another, and to force them in succession through the coating and buffing stations in end-to-end relation. As will appear, this abutted conveyance of the units serves to prevent leakage of coating material from the coating tanks during stop or rest periods of the machine.

The drive mechanism at the feed conveyor station includes a suitable source of power such as an electric motor 52 (FIGURES 1A and 3) which functions through the power take-off and pulley assemblies 54, 56 and 58 to operate the drive shafts 60 and 62 of driven rollers 64 and 66. These rollers are journalled in bearing blocks 68 mounted on the frame 12 in such fashion as to provide upstanding supports 70. The latter provide a convenient means to slidably mount bearing blocks 72 for idler rollers 74 and 76. As best seen in FIGURE 2A, the idler rollers are resiliently biased into engagement with the driven rollers 60 and 64 by springs or other suitable compression means 78, thereby insuring a positive grasping and alignment of the strip material in a horizontal plane as it is fed into the machine.

Referring to FIGURE 2A, as the boards or other units 50 are fed to the inlet roller combination 66, 76, they are positively grasped and fed to the second pair of rollers 64, 74 for subsequent feeding into the machine. It will be understood that the pairs of rollers both support and forcibly urge the lumber units in horizontally aligned relationship to the subsequent processing, as indicated by the arrows 80.

Preferably upstanding guides 82 are also provided on the upper surface of the frame 12 to insure longitudinal alignment of the boards as they pass through the feed conveyor 24 and into the coating stations 26 and 28.

Figure 4:
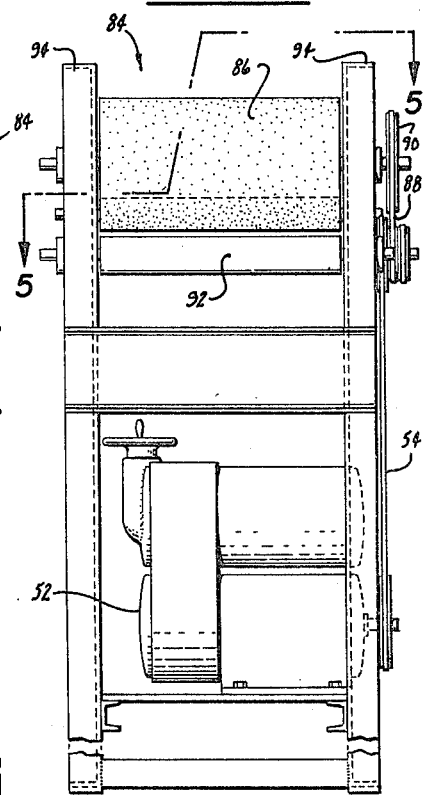
FIGURE 4 is a view along the line 4—4 of FIGURE 3.
Figure 3:
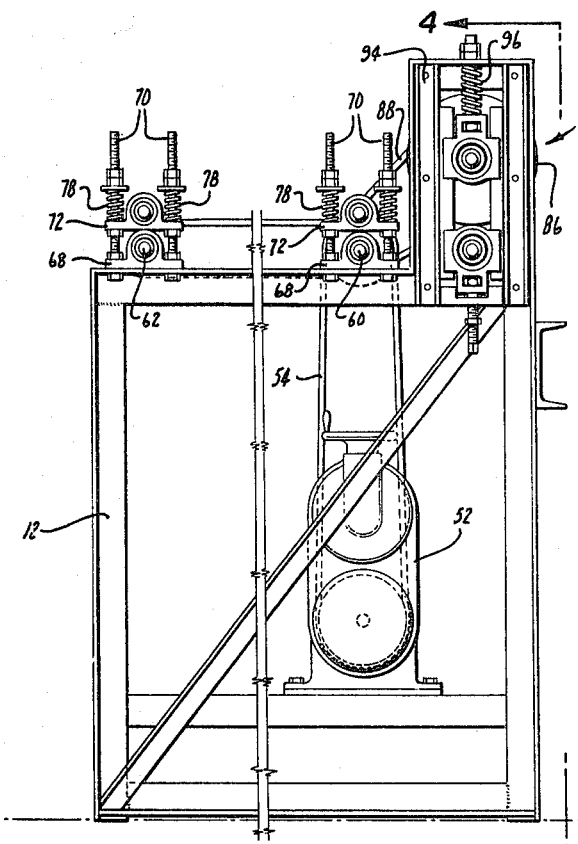
FIGURE 3 is an enlarged view in side elevation of machinery on the inlet side of the machine, adapted to feed strip material to coating stations within the machine.

If desired, a sanding or other surface abrading device can be employed at the feed conveyor station, as generally indicated at 84 in FIGURES 2A, 3, 4 and 5. Such mechanism can comprise a sanding roller 86 operated against the direction of movement of the strip material by means of a suitable power take-off and pulley assembly 80, 88, 90 (FIGURE 5) under the power of the motor 52. As best illustrated in FIGURES 3 to 5, the unit 84 can include a lower idler roll 92 mounted in vertically abutting relation to the roll 86 by means of a supporting framework 94. The sanding roller 86 can be resiliently biased against the idler roller by compression springs or like means 96 to insure a uniform application of abrading pressure to the strip material as it is fed to the subsequent coating operations.

*First coating station*

The units 50 are next advanced to a first coating station 26 where a suitable pre-coating or base-coating material e.g., solvent, preservative, sealer, stain, primer, etc.) is applied to the top, bottom and side surfaces of the strip material (see FIGURES 1A and 2A). This coating station generally makes use of a chamber which is closed to the atmosphere, and which contains a quantity of the surface coating material. Inlet and outlet means on opposite sides of the chamber generally conform to the cross-section of units of lumber or other strip material being passed through the station.

In the illustrated embodiment, the coating station 26 makes use of an airtight tank 100 adapted to contain a quantity of coating material 102. An access line 104 can be provided for the introduction of coating liquid to the interior of the tank, along with a closure 106 normally closed to the atmosphere. An inlet assembly 108 is provided near the bottom of the tank for the introduction of units of strip material into the tank in endwise abutting relation. An outlet assembly 110 is similarly provided on the opposite side of the tank so as to be in substantially horizontal alignment with the inlet assembly. A drain line 112 and a removable side wall 114 can also be provided to facilitate cleaning of the tank following use. It is also desirable to provide a sight glass assembly 116 to indicate the level of coating material in the tank during coating operations.

Figures 6, 7:
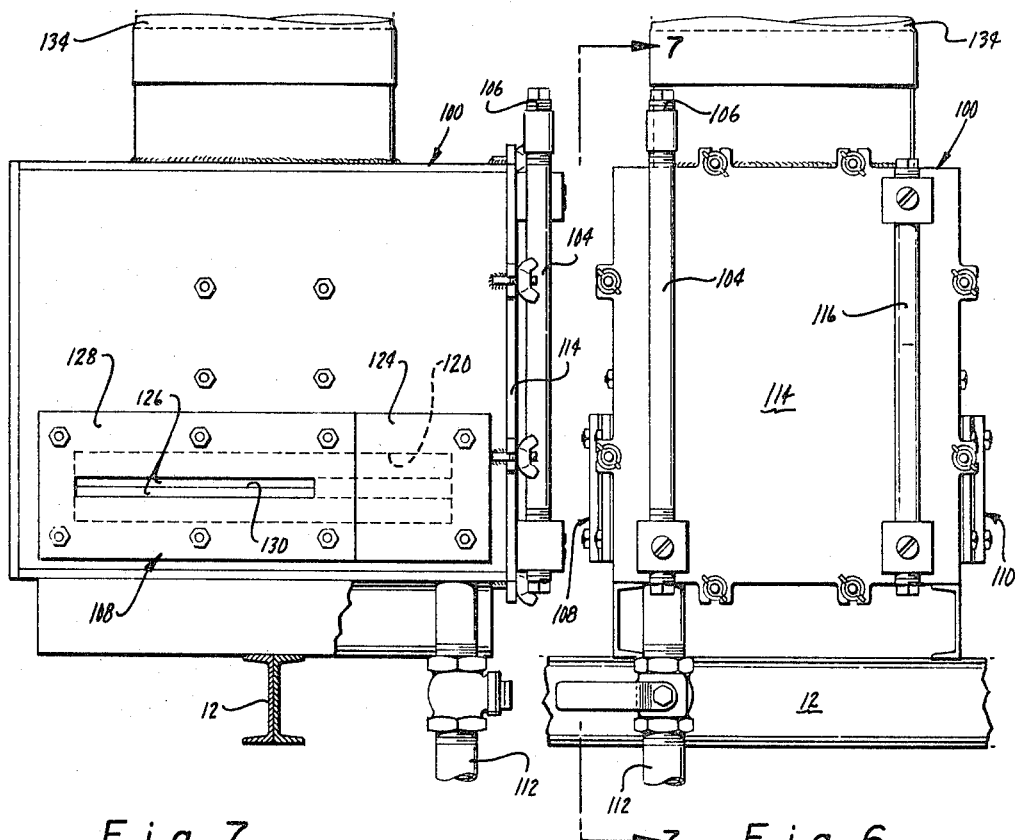
FIGURE 6 is a view in side elevation of a coating station within the machine.
FIGURE 7 is a view along the line 7—7 of FIGURE 6.
Figure 8:
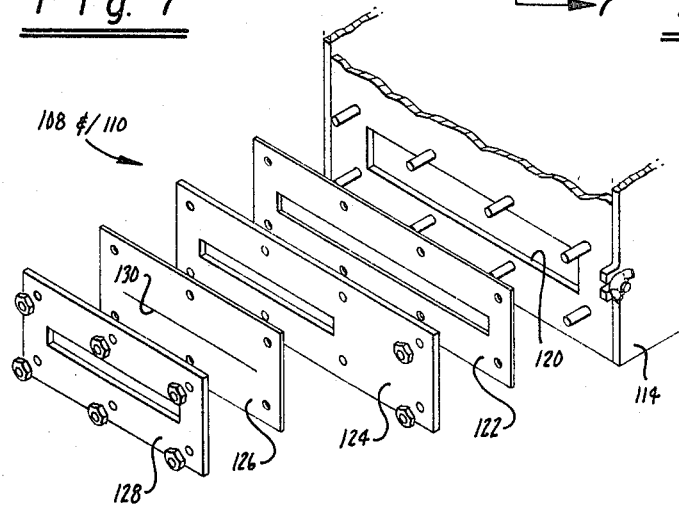
FIGURE 8 is an exploded perspective view showing details of sealing means associated with the coating station.

Referring to FIGURES 6 to 8, the inlet assembly 108 is seen to comprise an opening 120 in the wall of the tank which is substantially closed by sealing and guiding members conforming generally to the cross-section of the strip material being introduced to the tank. These members include a first resilient member or gasket 122, a first back-up plate 124 to hold the gasket securely in place, a second resilient member or gasket 126 and an outer back-up plate 128 to hold the outer gasket securely in place. In general the tank opening 120 and gasket 122 are dimensioned to receive the largest units of stock to be coated. In contrast, the backup plates 124, 128 and gasket 126 are dimensioned to a particular stock size, with a set of the members 124, 126, 128 being provided to accommodate each size and shape of stock to which the system is adapted. Thus, as particularly illustrated in FIGURES 7 and 8, these members are dimensioned to a board of considerably less width than the capabilities of the opening 120 and gasket 122.

The outlet assembly 110 can be constructed similarly to the inlet, except that the positions of the individual members are reversed as indicated in FIGURE 6. As will be understood, the inlet assembly 108 functions to sealingly receive units of strip material 50 and guide the same through the interior gasket 122 of the outlet assembly 110. Preferably, the resilient gasket members 122, 126 are constructed of tough elastic material, such as synthetic or natural rubber, capable of yielding to allow passage of the strip material and also of returning to an initial sealing position. For example, the opening in the gasket 126 can be in the form of a slit 130 of sufficient width to allow passage of the strip material. In the outlet assembly 110, this resilient, slit-like opening functions to wipe excess coating material from the outgoing units 50, facilitating further processing, as will appear.

It is a feature of the invention that positive acting suction means are provided above the level of coating material within the tank 100, serving not only to additionally seal the inlet and outlet assemblies against outward flow of coating material but also to assist in removal of the coating material not actually bound to the surface of the lumber or other strip material undergoing the treatment. Referring particularly to FIGURES 1A and 2A, the space 132 above the level of coating material in the treating chamber is connected to an outlet suction line 134. The latter is connected to a suitable source of suction which may comprise the positive action blower unit 136. The suction induced in the head space 132 of the tank is sufficient during operation to cause a continuous flow of air into the tank about the periphery of strip material positioned within the inlet and outlet assemblies 108 and 110. As previously indicated, this inward flow of air serves to seal the inlet and outlet openings, and also to remove any liquid coating not actually bound to the surface of the strip material leaving the tank (i.e., by adsorption onto the surface of the strip material). The combined effect of the described suction and gasketing at the coating station is to permit continuous penetration of the coating material into the surface of units within the tank while simultaneously preventing build-up of excess thicknesses of coating material on the exterior surfaces of stock leaving the tank.

Second coating station

The units 50 discharged from the first coating station 26 are immediately advanced to a second coating station 28 where suitable top coating materials (e.g., pigmented wood sealer, stain, prime coat, top coat, etc.) are applied to the top, bottom and side surfaces of the strip material in the same fashion as at station 26. This coating station can be identical in construction and operation to the coating station 26, and consequently need not be described in further detail. If desired, further coating stations (not shown) may be employed in addition to the stations 26 and 28, to permit further applications of coating material to the units 50 passing through the system.

The described coating operations, and particularly the later coating stages (i.e., station 28), are preferably carried out in a bath of coating material simultaneously with wiping of the surfaces of the units 50 to cause a maximum penetration as well as a uniform application of the coating material upon the exposed surfaces of the strip material. In this illustrated apparatus (note FIGURE 2A) this operation is accomplished by a plurality of brushes 150, 152 positioned above and below the strip material as it passes through the tanks 100 of the coating stations. These brushes extend transversely across the width of the tank, or perpendicular to the direction of stock movement through the tank. Any suitable mounting means for the brushes can be employed, consistent with free flow of coating material within the interior of the tank. As shown in FIGURE 2A, the mounting can comprise channel members 154 dimensioned to receive the base or backing of the brushes, and supported by cross members 156 or upon the bottom of the tank 158. In use, for example in tank 100 at the pre-coating station 26, the brushes cause penetration of the pre-coating material (e.g., solvent, preservative, etc.) to effect cleaning or removal of dirt and extractives from the surfaces of the strip materials and uniform application of the pre-coating material to the top and bottom surfaces of the stock. In the tank 100a at the station 28, the brushes perform a similar function. However, in this instance, they may also serve to cause displacement of the pre-coating material with the secondary coating material contained in the tank 100a. The brushes also function to insure a uniform wiping action of the stock as it is discharged through the slit opening 130 of the outlet gaskets 126, at both the pre-coating and top coating stations 26 and 28.

The coating operations at stations 26 and 28 are not only effective to rapidly coat the units of strip material on both sides, but also effect a uniform balanced surface treatment which tends to minimize warping and bowing of the units such as normally accompanies processing to coat first one side and then the other. In general, these coating stations can be constructed as illustrated and described herein or, alternatively, they can be constructed as illustrated and described in copending application, Serial No. 48,713, filed August 10, 1960, now Patent No. 3,084,662.

Buffing station

The buffing station 30 (FIGURES 2A and 2B) functions to receive the strip material from the coaters and to immediately subject the same to a rapid wiping and burnishing action. In the illustrated apparatus, rotary brushes are generally employed to exert a positive wiping and brushing action upon all exposed exterior surfaces, including top, bottom and side surfaces.

Referring to FIGURES 2B and 11, the two side brushes 160, operated by the motors 162, initially wipe excess material from the edges of the units 50. These brushes preferably are constructed with soft, relatively long bristles (of nylon or other suitable material) to insure efficient removal of excess coating material from the edge surfaces. As best illustrated in FIGURES 10 and 11, the motors 162 are mounted on vertical shafts 164, and within slots 166, 168 in the cross frame member 15, to permit both vertical and lateral adjustments of the brushes 160 with respect to one another. This construction insures a proper positioning of the brushes relative to the edges of the stock, as necessary in treating various types of strip material (e.g., tongue and groove, V-joint, etc.).

Following the initial contact of the brushes 160, the strip material is subjected to the rapid rotary contacts of top and bottom roller brushes 170 and 172. As illustrated in FIGURES 10 and 12, these brushes comprise a plurality of bristles 174 mounted in conventional fashion on the outer surface of perforated rollers 176. As shown in FIGURE 9, the bottom rollers are journalled in side plates 178 mounted for vertical adjustment on the upstanding supports 180. The top roller brushes are similarly journalled in mounting plates 182 for vertical adjustment on the upstanding supports 184 carried by the bottom plates 178. This construction permits a proper positioning of the pairs of brushes beneath and above the strip material passing through the buffing station 30 (note FIGURE 2B).

The pairs of top and bottom roller brushes 170, 172 are rotated against the direction of movement of stock by the motor 186 and power take-off assemblies 188, 190. Doctor blades 192 remove excess material from the brushes following contact of the brushes with the stock.

The effect of the operations at station 30 is to force the coating material on the surface of the stock into the surface layers, and to simultaneously remove any excess material so as to present a uniform surface to subsequent finish coat operations. In some coating operations, the brushes at station 30 can be employed to apply additional coating and/or finishing materials to the surfaces of the strip material. This latter operation can be accomplished by circulating such additional material through the interior of the rolls and out through the perforations 194, causing the additional material to be evenly applied by the rotating surface of the brush units. The circulation system to accomplish this result is shown at 196, 198 in FIGURE 9. If desired, suitable solvent material can also be flushed through the brushes by the same circulation system, to effect cleaning of the brushes following use.

As particularly illustrated in FIGURE 1B, an exhaust fan and hood assembly 197, 199 is positioned immediately beyond the buffing station 30 above the discharge conveyor. This exhaust unit is effective to remove solvent fumes developed as a result of the buffing at station 30.

Discharge conveyor

The discharge conveyor 32 (FIGURES 1B and 2B) comprises a continuous belt conveyor 200 adapted to receive coated strip material from the coating and buffing stations 26, 28 and 30, and to convey the same away from these operations at a somewhat greater rate of speed than that imparted to the strip material by the feed conveyor mechanism 24. The discharge conveyor thus functions to separate the individual units of stock (which have been in abutting relation during passage through the coating and buffing stations), and to pass them as individual units through the finish coating station 34 to the drying station 36.

Referring to FIGURES 2B and 13, the endless belt conveyor 200 is reaved about a plurality of support rollers 202 journalled in the supporting frames 16 and 18. In the illustrated embodiment, the conveyor is maintained in a desired tension by a tensioning roller 204, preferably attached to the frame of the buffing station 30. The drive mechanism for the discharge conveyor includes a suitable source of power such as an electric motor 206 (FIGURES 1B and 13) which functions through an appropriate power take-off and pulley assembly 208 to operate the driven pulley 210. Intermediate its ends the conveyor 200 is depressed about an idler roller 212 to facilitate operation of the finish coating station 34, as will hereinafter be described. Adjacent the upper surfaces of the pulley, support plates 214 are preferably provided to prevent bowing or sagging of the strip material as it passes through the finish coating station. In other respects the discharge conveyor is of conventional construction.

Finish coating station

As illustrated in FIGURES 2B and 13, the finish coating station 34 is mounted above an intermediate portion of the discharge conveyor 32. In general, the station 34 operates to apply a thin film of finish coat material (e.g., lacquer, clear resinous sealer, etc.) to the upper surface of the units of strip material in a continuous operation.

As illustrated in FIGURE 13, a fluid circulation system supplies a continuous supply of finish coat material to the finish coating mechanism 220, which may be of the conventional film or "curtain" type. The circulation system generally employs a fluid pump 222, operated by the electric motor 224 and speed reduction unit 226. The pump operates to circulate the coating material through the inlet line 228 through a filter 230 to the coating mechanism 220. A trough 232 positioned below the level of the conveyor, and in the depressed area thereof, functions to receive excess coating material flowing over the edges of the treated stock and to discharge the same through the return conduit 234. The latter conveniently returns the excess material to a tank or reservoir 236 positioned above the inlet side of the pump 222.

Referring to FIGURES 14 and 15, the coating mechanism 220 comprises a rectangular tank 240 open on the discharge side 242, and provided with a series of sub-dividing partitions 244 and 246. As illustrated, the inlet conduit 228 introduces the coating material below the surface of coating material in compartment 248, through a distributing head 250. The coating material flows over the top of the partition 244 and beneath the partition 246 to insure an even flow of material over the parallel knife edge member 252. This construction insures a continuous flow of coating material into a thin film or curtain 254 which effectively obstructs the path of movement of the units of strip material 50 on the conveyor belt 200. The coating unit 220 thus cooperates with the discharge conveyor 32 to apply a thin uniform coating of finish coat material to the upper surface of the strip material as it passes through the station 34.

As illustrated in FIGURE 14, vertical guide members 256 are preferably mounted on either side of the coating mechanism 220 to insure proper alignment of the units of strip material as they pass through the finish coating station. If desired, provision for vertical adjustment of the coating mechanism can be provided, and in the illustrated apparatus comprises a slide rod 258 and threaded adjustment rod 260 operated by the manual rotary device 262. As will be understood, rotation of the device 262 causes cooperating threads in the support block 264 to induce vertical movement of the coating mechanism on the threaded member 260 and slide 258.

Drying station

Final drying of the coated strip material can be achieved at the station 36 in any conventional manner. Since the drying operation is a final step, the drying station can comprise nothing more than a plurality of drying racks to which the coated units 50 are delivered. Alternatively a drying tunnel 270 can be provided and can include suitable blower units to induce a forced draft of air across the units of strip material, along with heating elements 274 and other equipment customarily associated with drying operations. Suffice to say that the drying step is not critical to the operations in accordance with the present invention, and consequently any satisfactory drying procedure can be employed consistent with the particular coating materials used at the various coating stations, and in the finish coater.

Operation

In the operation of the machine, units of lumber or other strip material 50 which have previously been cut and sized to desired length and cross-section are fed at any desired rate to the inlet conveyor 22. Upon movement of each unit 50 into engagement with the first pair of rollers 66, 78 at the feed conveyor station 24 (either manually or in response to advance of additional units 50 onto the inlet conveyor), the individual units are positively fed in continuous fashion through the edge guides 82 to the second pair of feed rollers 64, 74. This last pair of rollers positively feeds the units of lumber under the sanding roller 84 through the opening of the inlet assembly 108 at the first coating station 26. In a typical operation, the feed conveyor mechanism 24 functions to positively push the units of strip material through the first coating station 26 and the second coating station 28. In a rest position of the machine, the stock therefore fills the openings in the inlet and outlet assemblies of the coating tanks 100 and 100a, providing additional protection against leakage of coating material from these tanks. This relationship is illustrated in FIGURE 1A, which shows a unit 50 in rest position within the stations 26, 28, and about to be engaged by a new unit 50 being fed through the feed conveyor station 24. As will be understood, the latter will cause the incoming unit to abut the end of the unit of stock in position in the coating stations, and to force the same through the coating stations 26, 28 through the brushing station 30, and onto the discharge conveyor 32. In this way successive units of strip material are positively advanced through the coating and brushing operations, whereupon the discharge conveyor conveys the units through the finish coating operation at 34 to the drying station 36.

The speed of operation of the feed conveyor mechanism to some extent depends upon the particular type and quality of the strip material being treated. However, satisfactory results have been obtained with a wide variety of various types of strip materials within the range of linear advance between about 50 to 100 feet per minute. In the case of boards and other units of lumber, very satisfactory results have been obtained at an average rate of feed of 100 feet per minute.

The operations in the bath coating stations 26 and 28 also depend in large measure upon the particular treating or coating materials being employed at these stations. For example, in the sealing, staining and lacquer coating of units of lumber, it is frequently desirable to employ a solvent (i.e., naphtha or other mineral spirits, xylene, toluene, etc.) in the pre-coating station 22 to clean the surface of the boards and to remove dirt and extractives from the surface portions to be coated. The solvent also serves to exhaust surface air from the top layer of wood fibers, wetting the same, and generally render the boards receptive to the following coats of penetrating sealer, stain, etc. In contrast, when the coating material is a paint, a pigmented resinous material, a varnish, etc. the operations at the stations 26 and 28 effect a continuous penetration of the coating materials into the exposed surface areas of each unit passing through the respective tanks 100, 100a, including the top, bottom, edge and end surfaces. In like fashion, the volume of air exhausted through the blower units 136, 136a, and the degree of suction required to achieve effective sealing at the inlet and outlet openings of the coating tanks, will vary somewhat with the type of strip material being treated, the viscosity of the coating liquid, the speed of advance of the stock and similar variables. In the specific case of treating lumber with various types of coating material, the stations 26 and 28 have been effectively operated at relatively low pressures ranging from about 0.5 to 10 pounds per square inch to create sufficient forces in suction to not only prevent the coating liquid from flowing out of the coating tanks, but also to prevent discharge of any coating material not actually bound to the surface of the treated lumber exiting through the outlet openings 110 and 110a.

Regardless of variations due to differences in the stock and the coating materials employed, the operations at the bath coating stations 26 and 28 generally effect a simultaneous impregnation due to hydrostatic pressure, brushing within the tank to insure a uniform coating and to assist in the penetration of the surface areas, and a wiping of excess coating material from the surfaces of the treated stock as it passes through the tank outlets to the next operation. The resultant vacuum stripping and "squeegee" effects upon the surface of the outgoing stock makes possible the continuous multiple applications of coats of coating material, without any intermediate drying steps between the successive layers or applications of material. By way of specific illustration, primer coats of paint have been applied at the pre-coating station 26, following which one or more top coats can be applied at coating stations 28 without any intermediate drying step. Alternatively, various organic solvents (e.g., naphtha, toluene, etc.) have been applied as a pre-coat material, followed by various pigmented resin sealers (e.g., pigmented alkyd resin sealers, specifically "Rez," Monsanto Chemical Company). If desired, various additives can also be employed (e.g., 5–10% pentachlorophenol in the solvent, as a preservative).

Following the coating operations in the immersion tanks at stations 26 and 28, the exposed surfaces of the units 50 are subjected to rapid rotary brushing (e.g., at rotary speeds of the order of 1800 r.p.m.) at the station 30 to remove excess coating material and to additionally insure an even surface coating and appearance of the units. Thereafter, the units can be passed to the finish coating operations at station 34 or, if desired, directly to final drying at station 36. The rotary brushes effect a burnishing and even penetration of the coating material to insure a uniform surface for the subsequent drying, or the finishing operations at station 34. Alternatively, the roller brushes 170 at station 30 can also be employed to apply an additional coating of material to the upper and lower surfaces of the units 50.

It will be observed that the units 50 are forced through the buffing station 30 by the feed conveyor mechanism 24 until a substantial portion of the unit 50 overlays the discharge conveyor 32. When the rearward end of the unit is finally released by the pinch rolls 70, 74 at the station 24, the discharge conveyor functions to move the units rapidly away from the buffing station to the finish coating station. In general, the discharge conveyor is operated relatively faster than the rate of feeding imparted by the feed conveyor station, for example within the range of 50 to 500 feet per minute. In the specific example of coating lumber with stain, paint, etc., the discharge conveyor 32 can be effectively operated at a speed of about 200 feet per minute. The belt conveyor 200 operates to carry the individual units at spaced apart intervals through the film or curtain 254 at the station 34, and at a uniform rate which insures application of a thin, even film of finish coat material upon the upper surfaces of the units 50. The finish coat material, and the final drying cycle, again depend on the particular sequence of coating materials employed. By way of illustration, lumber units initially treated with a solvent or a preservative solution and thereafter with one or more coats of a pigmented sealer, can be effectively coated with a clear lacquer (e.g., of the cellulose acetate butyrate type) and immediately discharged to the drying station 36. As previously indicated, drying can be accomplished in a tunnel dryer of the type illustrated, or upon open racks, for periods of time depending upon the particular coating sequence employed in the processing. In the case of the lumber units specified, the final lacquer coat can be air dried in about 30 to 60 minutes, or with forced drafts of air heated to about 100° to 120° F., within a drying period of from 5 to 10 minutes. These variations are possible because no intermediate drying steps or other complicated intermediate processing is necessary.

While the invention has been illustrated and described in connection with a preferred embodiment, and in connection with a preferred sequence of processing steps, it is capable of many variations and modifications within the skill of those in this art, and within the scope of the claims appended hereto.

We claim:

1. In a system of apparatus for the continuous application of coating materials to successive units of relatively rigid fibrous and cellular strip materials: feed conveyor means, a series of substantially enclosed coating stations adapted to receive units of strip material from said feed conveyor means and to immerse the same in baths of coating material, said coating stations being disposed in succession without drying means therebetween, said coating stations including internal wiping means to engage and to force said material into at least the top and bottom surfaces of said units of strip material and means to simultaneously remove excess coating material from said surfaces with a wiping action, a buffing station adapted to receive units of strip material from said coating stations before drying and to force the coating material into all exposed surfaces thereof while removing any remaining excess coating material from the units of strip material, and discharge conveyor means adapted to receive said units of strip material from the buffing station, said discharge conveyor means serving to discharge treated units of strip material to a final drying operation.

2. Apparatus as in claim 1 wherein surface abrading means are associated with said feed conveyor means.

3. Apparatus as in claim 1 wherein each of said coating stations includes a coating chamber closed to the atmosphere, means forming aligned inlet and outlet openings in said chamber, and means acting continuously above the level of liquid coating material in said chamber to exert forces in suction sufficient to seal about the periphery of strip material positioned within said means forming the chamber inlet and outlet openings.

4. Apparatus as in claim 3 wherein said internal means to force coating material into the surfaces of the strip material comprises brush means within each of said coating chambers adapted to engage the strip material.

5. Apparatus as in claim 3 wherein said means to remove excess coating material with a wiping action comprises gasket means in the outlet openings of said coating chambers.

6. Apparatus as in claim 1 wherein said buffing station includes a plurality of rotary brush means adapted to engage exposed longitudinal surfaces of said units of strip material.

7. Apparatus as in claim 1 including a finish coating station associated with said discharge conveyor and adapted to apply a thin film of finish coating material to said strip material prior to the final drying operation.

8. In a system for the continuous application of coating materials to successive units of lumber, a plurality of coating stations disposed in succession without drying means therebetween, feed conveyor means adapted to feed successive units of lumber through said coating stations, each of said coating stations comprising a coating chamber having inlet and outlet means for said units in a lower portion thereof, said coating chambers being otherwise closed to the atmosphere, said coating stations including internal brush means to engage and force said material into at least the top and bottom surfaces of said units of lumber, means acting continuously above the level of liquid coating material in said chambers to exert forces in suction sufficient to induce a continuous flow of air into said chambers about the periphery of lumber positioned within said inlet and outlet means, a buffing station adapted to receive units of lumber from said coating stations and to force the coating material into the surface thereof while removing all remaining excess coating material from said units; said buffing station including means to buff all sides of said units of lumber to condition the same for final drying, and discharge conveyor means adapted to receive said units of lumber from the buffing station, said discharge conveyor means serving to discharge treated units of lumber to said final drying operation.

9. In a system of apparatus for the continuous application of coating materials to successive units of lumber and like materials, feed conveyor means, a first coating station adapted to receive the units of lumber from said feed conveyor and to immerse the same in a bath of precoating material, said first station including brush means immersed therein to effect penetration of the precoating material and to remove excess material with a wiping action, a second coating station adapted to receive units of lumber directly from said first station and to immerse the lumber in a bath of surface coating material, said second coating station also including brush means immersed therein to effect penetration of the surface coating material in the surfaces of said lumber and to simultaneously remove excess material therefrom with a wiping action, a buffing station adapted to receive units of lumber from said coating stations and to force said coating materials into the top, bottom and side surfaces of said lumber while removing all remaining excess coating material therefrom, discharge conveyor means adapted to receive units of lumber from said buffing station, a finish coating station associated with said discharge conveyor means and adapted to apply a thin film of finish coating material to at least one coated wiped surface of said units of lumber, and a drying station associated with said discharge conveyor means.

10. In a system of apparatus for the continuous application of coating materials to successive units of lumber: feed conveyor means, a first coating station adapted to receive the units of lumber from said feed conveyor and to immerse the same in a bath of pre-coating material, said first station including immersed brush means to effect penetration of the pre-coating material and to remove excess material with a wiping action, a second coating station adapted to receive units of lumber from said first station and to immerse the same in a bath of surface coating material, said second coating station also including immersed brush means to effect penetration of the surface coating material into the surfaces of said lumber and to simultaneously remove excess material therefrom with a wiping action, each of said coating stations comprising a coating chamber having inlet and outlet means for units of lumber in a lower portion thereof, said coating chambers being otherwise closed to the atmosphere, means acting continuously above the level of liquid coating material in said chambers to exert forces in suction sufficient to induce a continuous flow of air into said chambers about the periphery of units of lumber positioned within said inlet and outlet means, a buffing station adapted to receive units of lumber from said coating stations prior to drying and to force said coating materials into the top, bottom and side surfaces of said units of lumber while removing all remaining excess coating material therefrom, discharge conveyor means adapted to receive units of lumber from said buffing station, a finish coating station associated with said discharge conveyor means and adapted to apply a thin film of finish coating material to a coated wiped surface of said units of lumber, and a drying station associated with said discharge conveyor means.

11. Apparatus as in claim 10 wherein said means to effect penetration and removal of excess coating materials at said station include top and bottom brush means disposed within said coating chambers in contact with said units of lumber.

12. Apparatus as in claim 10 wherein said means to effect penetration and removal of excess coating materials at said station include resilient gasket means disposed within said chamber inlet and outlet means and in contact with said units of lumber.

13. In a rapid, continuous method for the application of coating materials to elongated units of lumber without any intermediate drying step, the steps of immersing said units of lumber in successive baths of coating material under conditions of controlled hydrostatic pressure, subjecting the top and bottom surfaces of said units of lumber to brushing while immersed in said coating baths to force the coating material into said top and bottom surface layers, simultaneously wiping the top and bottom surfaces of said units of lumber as they are discharged from said coating baths to remove excess coating material, buffing all coated surfaces of said units of lumber discharged from the last of said coating baths to remove any remaining coating material not adsorbed into and onto the surfaces thereof, and drying the successive units of lumber.

14. The method as in claim 13 wherein at least one of said coating baths comprises a pigmented, penetrating wood sealer.

15. In a rapid, continuous method for the successive application of coating materials to successive relatively flat units of lumber without any intermediate drying step, the steps of first immersing said units of lumber in a bath of pre-coating material, said pre-coating material serving to penetrate and remove air and other contaminants from surface layers and openings of said units of lumber, simultaneously subjecting the flat surfaces of said units to brushing to cause penetration of said pre-coating material into exposed outer layers thereof, removing the units of lumber from said bath of pre-coating material while simultaneously wiping the flat surfaces thereof to remove excess pre-coating material, immediately immersing said units of lumber in a bath of surface coating material adapted to penetrate and to alter the appearance and surface characteristics of said units of lumber, simultaneously subjecting the flat surfaces of said units of lumber to brushing to remove excess surface coating material, discharging the units of lumber from said bath of surface coating material while simultaneously wiping the flat surfaces thereof to remove excess surface coating material, buffing all coated surfaces of said units of lumber to remove any remaining coating material not adsorbed into and onto the surfaces of said lumber and to condition the same for final drying, and drying said units of lumber to produce final products.

16. A method as in claim 15 wherein a thin film of a finish coating material is applied to at least one flat surface of said successive units of lumber prior to drying of the same.

17. A rapid, continuous method for the successive application of coating materials to successive units of lumber without any intermediate drying step, comprising: continuously immersing successive units of said lumber in a bath of precoating material under conditions of controlled hydrostatic pressure, said pre-coating material serving to penetrate exposed surface layers of the lumber to cleanse the same of contaminants, extractives and entrapped air and to seal said surface layers, simultaneously brushing at least the top and bottom surfaces of said units of lumber as they pass through the bath of pre-coating material to assist in the cleansing and sealing action of said pre-coating material, continuously removing the successive units of lumber from said pre-coating bath while simultaneously wiping at least the top and bottom surfaces thereof to remove excess pre-coating material, continuously immersing the successive units of pre-coated lumber in a bath of surface coating material under like conditions of controlled hydrostatic pressure, said coating material serving to alter the appearance and surface characteristics of said units of lumber, simultaneously brushing at least the top and bottom surfaces of said successive units of lumber to cause the surface coating material to partially displace and to form a surface layer above said pre-coating material, removing the successive units of lumber from said bath of coating material while simultaneously wiping at least the top and bottom surfaces thereof to remove excess surface coating material, continuously buffing the top and bottom surfaces and edge surfaces of said successive units of lumber to effect further penetration of said coating materials as well as removal of excess coating materials not adsorbed into and onto the surfaces of said lumber thereby conditioning said units of lumber for coating and drying, immediately thereafter continuously applying a thin film of finish coating material to at least one surface of said successive units of lumber, said finish coating material forming a thin protective layer above the coated surface, and drying said successive units of coated lumber.

References Cited by the Examiner

UNITED STATES PATENTS

| | | | |
|---|---|---|---|
| 930,648 | 8/1909 | Crowell. | |
| 1,710,357 | 4/1929 | Grunwald | 15—210.3 |
| 1,933,401 | 10/1933 | Ward | 117—114 |
| 2,341,161 | 2/1944 | Partee et al. | 117—64 |
| 2,908,590 | 10/1959 | Norris | 117—72 |
| 2,950,215 | 8/1960 | Slater et al. | 117—102 |
| 2,978,355 | 4/1961 | Busch | 117—64 |
| 3,084,662 | 4/1963 | Badger | 118—404 |
| 3,119,134 | 1/1964 | Armitage | 15—4 |
| 3,168,414 | 2/1965 | Fleissner | 117—115 |

ALFRED L. LEAVITT, *Primary Examiner.*

RICHARD D. NEVIUS, *Examiner.*

A. H. ROSENSTEIN, *Assistant Examiner.*